US006299336B1

(12) United States Patent
Hulse (10) Patent No.: US 6,299,336 B1
(45) Date of Patent: Oct. 9, 2001

(54) LOW PROFILE LIFT MOUNTING ARRANGEMENT FOR TELESCOPING MAST

(75) Inventor: John A. Hulse, Akron, OH (US)

(73) Assignee: The Will-Burt Company, Orrville, OH (US)

(*) Notice: Subject to any disclaimer, the term of this patent is extended or adjusted under 35 U.S.C. 154(b) by 0 days.

(21) Appl. No.: 09/384,071

(22) Filed: Aug. 26, 1999

(51) Int. Cl.⁷ ............................... F21V 21/14; B60Q 1/05
(52) U.S. Cl. .................. 362/526; 362/403; 362/198; 362/272; 362/428
(58) Field of Search ..................................... 362/526, 385, 362/386, 294, 493, 419, 523, 96, 285, 286, 418, 431, 373, 413, 450, 486, 403, 198, 272, 428

(56) References Cited

U.S. PATENT DOCUMENTS

| | | | |
|---|---|---|---|
| 4,300,186 | * 11/1981 | Hurd | 362/540 |
| 4,413,451 | * 11/1983 | Featherstone et al. | 52/28 |
| 4,815,757 | * 3/1989 | Hamilton | 280/764.1 |
| 5,572,837 | * 11/1996 | Featherstone et al. | 362/385 |
| 5,743,635 | * 4/1998 | Hulse et al. | 362/385 |
| 5,980,070 | * 11/1999 | Hulse et al. | 362/385 |

* cited by examiner

Primary Examiner—Stephen Husar
Assistant Examiner—David V. Hobden
(74) Attorney, Agent, or Firm—Vickers, Daniels & Young (57) ABSTRACT

An improved low profile mounting arrangement is provided for a telescoping tube construction applied to the roof of a vehicle. The lowest mast section is nested between two vertically upright shaft support plates which journal a pivot shaft rotatably secured to a collar affixed to the bottom of the lowest mast section whereby rotation of the pivot shaft causes the telescoping mast to rotate from a horizontal to a vertically upright position. A pivot link mounted to an end of the pivot shaft extends downward adjacent a support plate side opposite to the side facing the telescoping mast so that an actuator secured to the pivot link is mounted on the side of the telescoping mast construction to achieve a low profile mount with minimal vertical elevation.

8 Claims, 8 Drawing Sheets

LOW PROFILE LIFT MOUNTING ARRANGEMENT FOR TELESCOPING MAST

INCORPORATION BY REFERENCE

The assignee's prior United States patents directed to various features of its telescoping mast construction are hereby incorporated by reference and made a part hereof:

U.S. Pat. No. 4,413,451 to Featherstone et al. issued Nov. 8, 1983, entitled "PNEUMATICALLY ACTUATED TILTING TELESCOPING MAST CONSTRUCTION", U.S. Pat. No. 5,572,837 to Featherstone et al. issued Nov. 12, 1996, entitled "PNEUMATIC TELESCOPING MAST", and, U.S. Pat. No. 5,743,635 to Hulse et al., issued Apr. 28, 1998, entitled "PNEUMATICALLY TELESCOPING MAST".

The patents identified above are incorporated herein by reference so that details of telescoping mast constructions and applications known to those skilled in the art need not be restated or explained in detail herein. The above-identified patents do not, per se, form or comprise the present invention.

This invention relates generally to the art of vehicular mounted, pneumatically actuated telescoping masts, and more particularly to an improved mounting arrangement for the telescoping mast construction.

The invention is particularly applicable to and will be described with specific reference to a vehicular mounting arrangement for a pneumatically actuated telescoping mast used for positioning electrical devices, specifically utility lighting. However, the invention has broader application and may be used as a vehicular mount for any type of light weight tubular, telescoping mast constructions whether pneumatically, hydraulically or mechanically (chain driven) actuated and whether or not carrying electrical fixtures or other devices.

BACKGROUND

Pneumatically actuated telescoping masts are well known in the prior art and they are generally of such a nature that they may be mounted on the roof of a motor vehicle, such as an emergency vehicle or utility vehicle. In such applications, the mast is generally used for positioning electrical devices, particularly lighting fixtures, at an elevated point above the vehicle. The effect is to immediately light a large area above the vehicle to allow emergency procedures to be performed under the light, such as at accident scenes or by utility work crews such as after a storm. Pneumatically actuated telescoping masts are particularly advantageous in such situations because they are lightweight, compact in a retracted position and generally have fall, open and unobstructed mast sections which permit electrical wiring to pass within and through the telescopic tubular mast sections for controlling electrical devices or fixtures.

Typically, the telescoping mast is in a horizontal position when the mast is in a stored, retracted position on the vehicle. The mast construction is typically rotated to a vertical upright position whereat it is extended by adjacent mast sections telescoping out from one another. However, as discussed in the '837 patent, there are emergency situations where the mast is desired to be raised at some angle relative to horizontal which is less than a vertically upright position. Further, there can be some applications where the mast is desired to be moved to the side of the vehicle and then raised.

The mounting arrangement typically used for securing the mast to the vehicle generally comprises a base plate which is secured to the vehicle and from which vertically extends a pair of transversely spaced, support plates which receives the lowest mast section therebetween. A pivot shaft or a pair of stubs shafts secured near to the bottom of the lowest mast section is journalled within the shaft support plates. Various lift mechanisms have been employed to rotate the telescoping mast construction about the pivot shaft from the horizontal to the vertical positions. All of these lift mechanisms are conceptually sound and adequately function to properly position the telescoping mast construction. However, the prior art lift mechanisms do not achieve the objectives of the present invention.

In the '837 patent, a toothed bell crank attached to the swivel shaft cooperates with a rack pinion drive at one side of the support shaft to rotate the mast construction to any desired vertical angle. There are some disadvantages to having an exposed tooth/rack drive arrangement and the position of the swivel produces a higher vertical mount arrangement than desired for some vehicular applications.

The '635 patent utilizes a mechanical actuator rod mechanism to avoid the exposed tooth/gear arrangement disclosed in the '837 patent but positions the pivot shaft at the center of the lowest mast section similar to that disclosed in the '837 patent. This results in the telescoping mast construction having a horizontal stored position vertically spaced from the vehicle's roof which is higher than what is otherwise possible.

In the '451 patent, the stub shafts are journalled at a laterally offset axis relative to longitudinal centerline of the lowest mast section. However, a hydraulic actuator is utilized and an intermediate link is positioned between the stub shaft bell crank and the hydraulic cylinders actuator rod which is not a particularly advantageous arrangement.

Figure 1A:
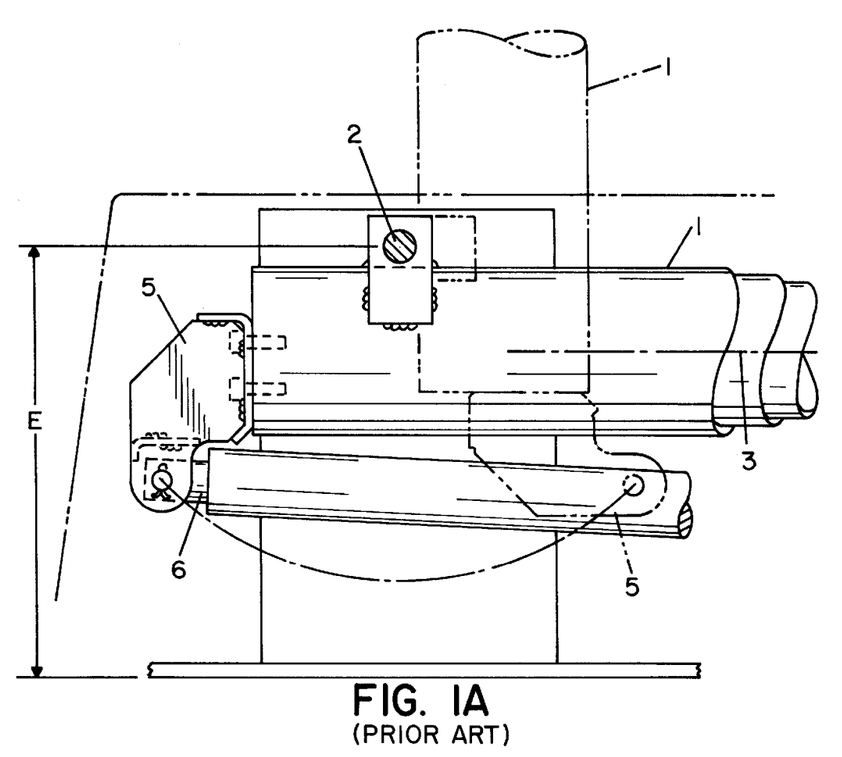
FIGS. 1A and 1B are schematic, side and end views, respectively, of a telescoping mast construction of a prior art pivoted lift arrangement for a telescoping mast.
Figure 1B:
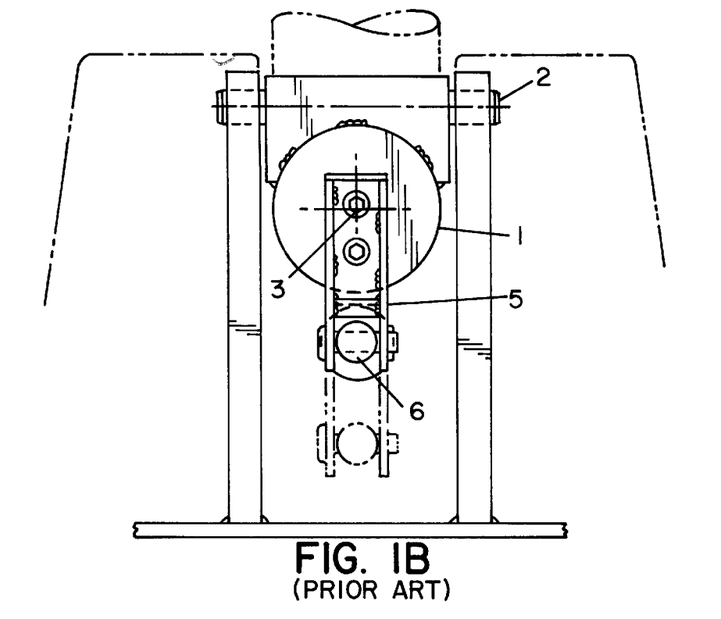

An extremely robust, sound lift arrangement the assignee commercially utilizes for its mast constructions is diagrammatically illustrated in FIGS. 1A and 1B. As shown, the lowest mast section 1 has secured thereto pivot shaft 2 rotatable about an axis laterally spaced from the longitudinal centerline 3 of lowest mast section 1. Mounted to the bottom end of lowest mast section 1 is a lift bracket 5 secured to the bottom of lowest mast section 1. An actuator rod 6 pinned to the bottom of lift bracket 5 rotates the mast construction from horizontal to vertical positions set by angular limit switches such as illustrated in the '635 patent. While positioning the lift bracket between the shaft support plates produces a lift arrangement which (unlike the '837, the '451 and the '635 patents) does not produce any bending moment on the lift mechanism, the actuator must be positioned beneath lowest mast section 1 resulting in a higher elevation mount designated by reference arrow E than what may be desirable for certain vehicular applications.

SUMMARY OF THE INVENTION

Accordingly, it is an object of the present invention to provide a mount arrangement for a tubular mast construction which has a low profile and which can stably support the mast construction at any desired positional area on the vehicle's roof.

This object along with other features of the present invention is achieved in a telescoping mast construction which is adapted to be mounted on a vehicle roof and carrying at one of its ends, an electrical fixture assembly. The mast construction includes a plurality of adjacent telescoping mast sections slidable relative to one another between a retracted position such as when the longitudinal axis of the mast construction is horizontal and an extended position such as when the longitudinal axis of the mast construction is vertical and the mast construction is raised by telescoping the mast sections from the lowest mast section. The improvement includes a pair of longitudinally extending, transversely spaced shaft supports vertically extending from a base plate with the lowest mast section positioned between the shaft supports. A collar mount is secured to the bottom of the lowest mast section and a pivot shaft is secured to the collar mount and journalled with the shaft support plates to lie on an axis laterally offset from the longitudinal axis of the mast and adjacent the uppermost surface of the collar mount when the mast construction is horizontal. A pivot link rotatably secured to one axial end of the pivot shaft extends vertically downward adjacent a pivot support side which is opposite that pivot support side adjacent the lowest mast section and a linear actuator having an actuator rod movable into and out of an actuator housing is provided. The actuator rod is pivotably secured to the pivot link and the actuator housing is pivotably secured to the base plate whereby the length of the pivot link relative to the position of the pivot shaft provides a low profile mast mounting arrangement extending no higher than about the pivot shaft when the longitudinal axis of the mast construction is in its stored horizontal position.

In accordance with another aspect of the invention, first and second longitudinally adjustable and spaced actuator limit switches controlling movement of the actuator into and out of the actuator housing are provided with a contact member movable with the actuator rod for contacting a limit switch at extended and retracted positions of the actuator rod whereby the rotation of the pivot link is precisely controlled by the longitudinal positions of the limit switches.

In accordance with yet another aspect of the invention, a splined connection rotatably secures the pivot shaft to the collar mount and a splined connection secures the pivot lever to the pivot shaft whereby the position of the pivot lever relative to the actuator rod may be variably set during mounting of the mast construction to the vehicle to assure longitudinal movement of the actuator rod in a substantially horizontal plane minimizing binding within the linkage and allowing effective use of the actuator force to rotate the mast construction to its desired vertical and horizontal positions.

In accordance with a somewhat subtle feature of the invention, a clevis is provided for the pivot link to better dissipate the moment arm effects resulting from the side mounting of the lift actuator.

It is thus an object of the present invention to provide a low profile mounting arrangement for a telescoping mast construction.

Still another object of the invention is to provide a vehicular mounting arrangement for a telescoping mast which utilizes a side mount pivot lever to position the mast at a low vertical elevation from the vehicle's roof while stably supporting the mast during rotation by an outrigger mount.

Yet another object of the present invention is to provide a mounting arrangement for a telescoping mast construction which utilizes a lift mechanism which can accurately position the telescoping tubular mast construction between desired horizontal and vertical positions.

Still yet another object of the present invention is to provide a vehicular mounting arrangement for a telescoping tubular mast construction which utilizes a lift mechanism for the mast construction which can be easily adjusted when mounting the mast to the vehicle.

Yet another object of the invention is to provide a relatively simple and inexpensive vehicular mounting arrangement for a tubular, telescoping mast construction which arrangement rotates the mast construction from a horizontal to a vertical position.

BRIEF DESCRIPTION OF THE DRAWINGS

The invention may take physical form in certain parts and arrangement of parts, a preferred embodiment of which will be described in detail in the Detailed Description of the Invention which follows and illustrated in the accompanying drawings which form a part hereof and wherein.

DETAILED DESCRIPTION OF THE PREFERRED EMBODIMENT

Figure 2:
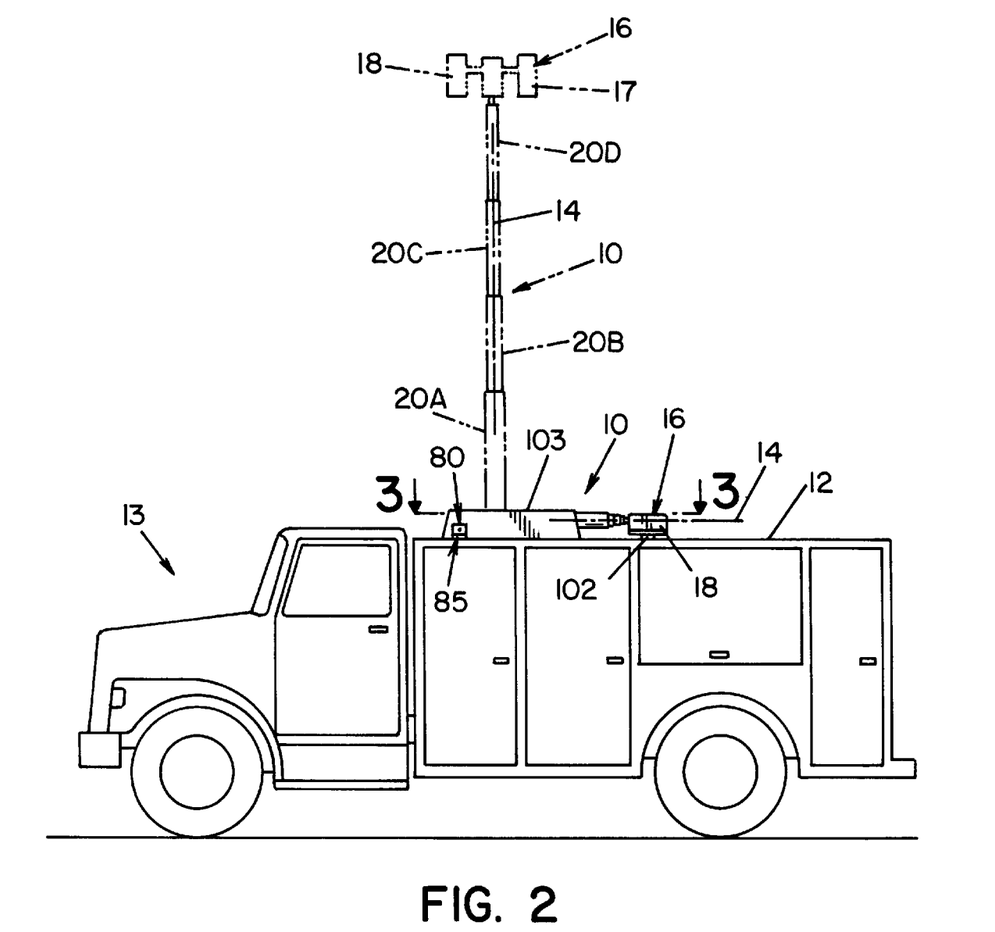
FIG. 2 is a side elevational view illustrating one use of the telescoping mast of the present invention.

Referring now to the drawings, wherein the showings are for the purpose of illustrating a preferred embodiment(s) of the invention only and not for the purpose of limiting same, FIG. 2 shows a telescoping mast construction 10 mounted on a roof 12 of a motorized vehicle 13. Telescoping mast construction 10 is shown in solid lines in FIG. 2 in its retracted or stored position and in broken lines in its vertical or upright position. More particularly, and for definitional purposes, mast construction 10 extends along a longitudinal axis 14. When mast 10 is in its retracted, stored position, its longitudinal axis 14 is horizontal and/or parallel to roof 12 of vehicle 13. In accordance with the present invention, mast construction 10 is capable of being placed at a tilt angle between 0° and 90° where, for the purposes of this description, 0° is defined as being parallel with the vehicle roof 12 and generally horizontal while 90° is in a vertically upright position, as shown by the broken lines of FIG. 2, and generally perpendicular to vehicular roof 12. It is to be clear that mast construction 10 can be placed at anywhere between 0° and 90°, although, in the normal usage, mast 10 is either positioned in its retracted, horizontal position or its vertically upright position, i.e., the two positions shown in FIG. 2.

As shown, telescoping mast construction 10 is equipped with a utility light 16 at the upper end thereof. In the embodiment illustrated, there are two rectangular boxes 17, 18, each containing a utility light and boxes 17, 18 can be remotely actuated to pivot in one plane and tilt in another plane and reference can be had to the patents incorporated by reference for a further description thereof. Telescoping mast construction 10 thus has the capability of providing the illumination to areas under bridges or over sharp drop-offs, such as cliffs and mountain roads. The telescoping mast construction can also be used to light the underside of an overpass or bridge. It should be appreciated that mast 10 may be outfitted with any desired electrical fixture, or with multiple light configurations depending on customer requirements and applications. It is also to be appreciated that telescoping mast construction 10 can be fitted with any number of devices and use of the term "electrical fixtures" covers all such devices whether or not electricity is conducted to the device.

Figure 3:
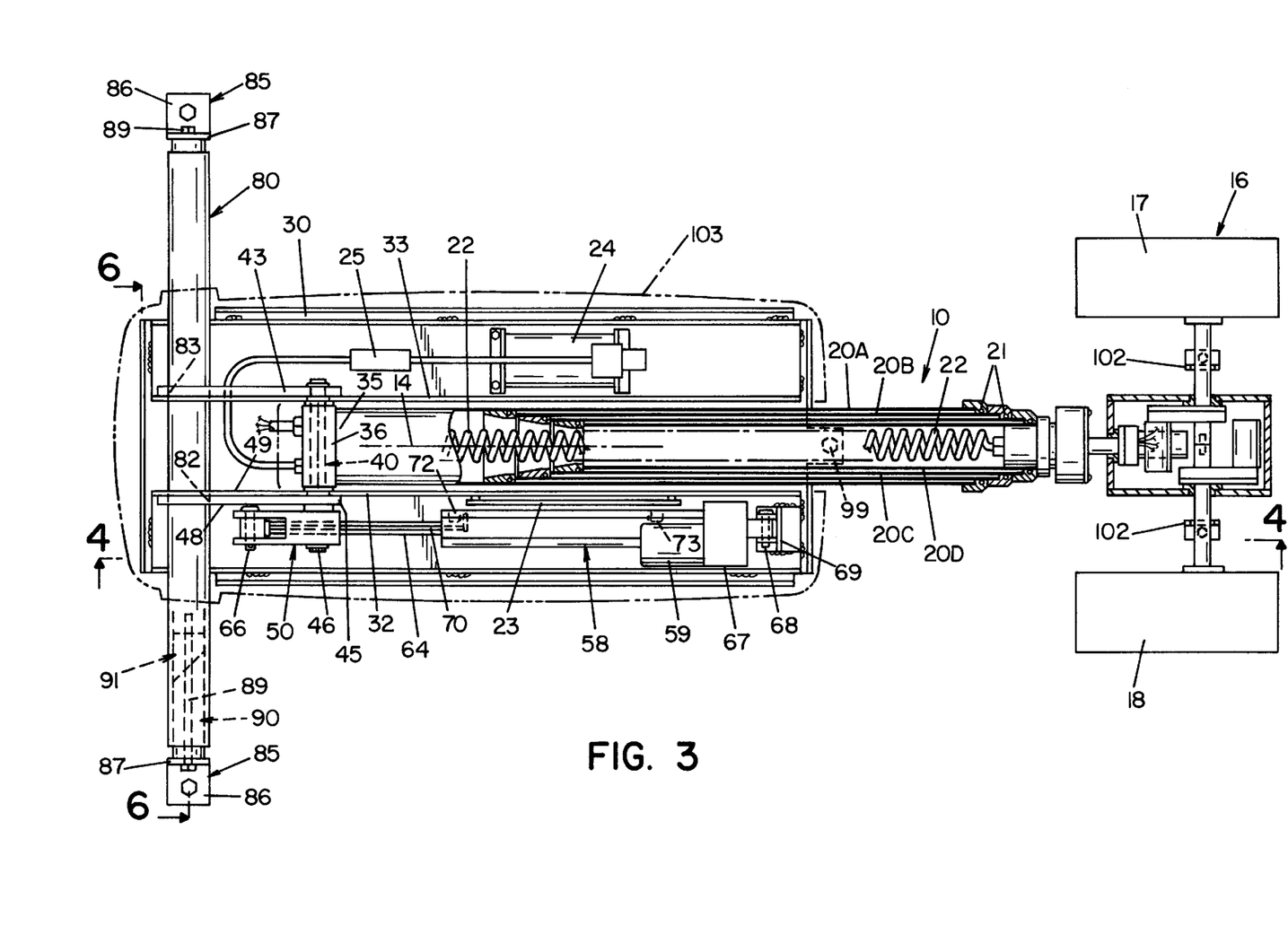
FIG. 3 is a plan view, partially in section, of the telescoping mast construction shown in FIG. 2 taken along lines 3—3 thereof.

Referring now to FIG. 3, mast construction 10 comprises a plurality of adjacent mast sections. In the preferred embodiment, there are four adjacent mast telescoping sections designated 20A through 20D. The lowest mast section about which mast construction 10 pivots is designated 20A and the highest or top mast section is designated 20D. Because a pneumatic telescoping mast construction 10 is shown, each mast section is pneumatically sealed as by o-rings 21 and telescopes relative to an adjacent mast section except for lowest mast section 20A which is stationary. Thus, mast section 20B telescopes into an out of mast section 20A, mast section 20C telescopes into and out of mast section 20B and top mast section 20D telescopes into and out of mast section 20C. As indicated in the Background discussion, a pneumatic telescoping tubular construction is preferred because of its weight and because the space within mast sections 20–20D is hollow thus permitting threading electrical wires 22 therethrough for powering utility light 16 and actuating the motors which tilt and pivot light boxes 17 and 18. Signals carried by wiring 22 are generated and under the control of the mast construction's printed circuit board 23. Air pressure to actuate telescoping mast 10 is supplied through a mast compressor 24 under the control of a solenoid actuated valve(s) 25 with the compressor and valve regulated by printed circuit board 23 which is intelligent and carries its own CPU. While a pneumatic mast construction 10 is illustrated and preferred for reasons noted, the invention is not necessarily limited to a pneumatic telescoping mast but can function if the mast was telescoped by mechanical drives such as chains or if the mast was actuated by a hydraulic arrangement.

As thus far described, mast construction 10 is entirely conventional.

Referring now to FIGS. 3 through 6, the mounting arrangement of the present invention includes a generally flat base plate 30 which, as shown, rests on the vehicle's roof 12. Extending vertically upward from base plate 30 is a pair of first and second shaft support plates 32, 33. Shaft support plates 32, 33 are longitudinally extending and transversely spaced from one another to receive therebetween lowest mast section 20A. At or adjacent the bottom end 35 of lowest mast section 20A is a collar 36 circumscribing and permanently affixed to lowest mast section 20A such as by weldment or otherwise. Extending through collar 36 is a pivot shaft opening 38 concentric about a pivot shaft centerline 39 and grooved, in the preferred embodiment, for a splined connection (although the collar connection can alternatively be a pinned connection). Received within pivot shaft opening 38 is a pivot shaft 40 which in the preferred embodiment is splined over that portion of its length which is received within collar 36.

Figure 5:
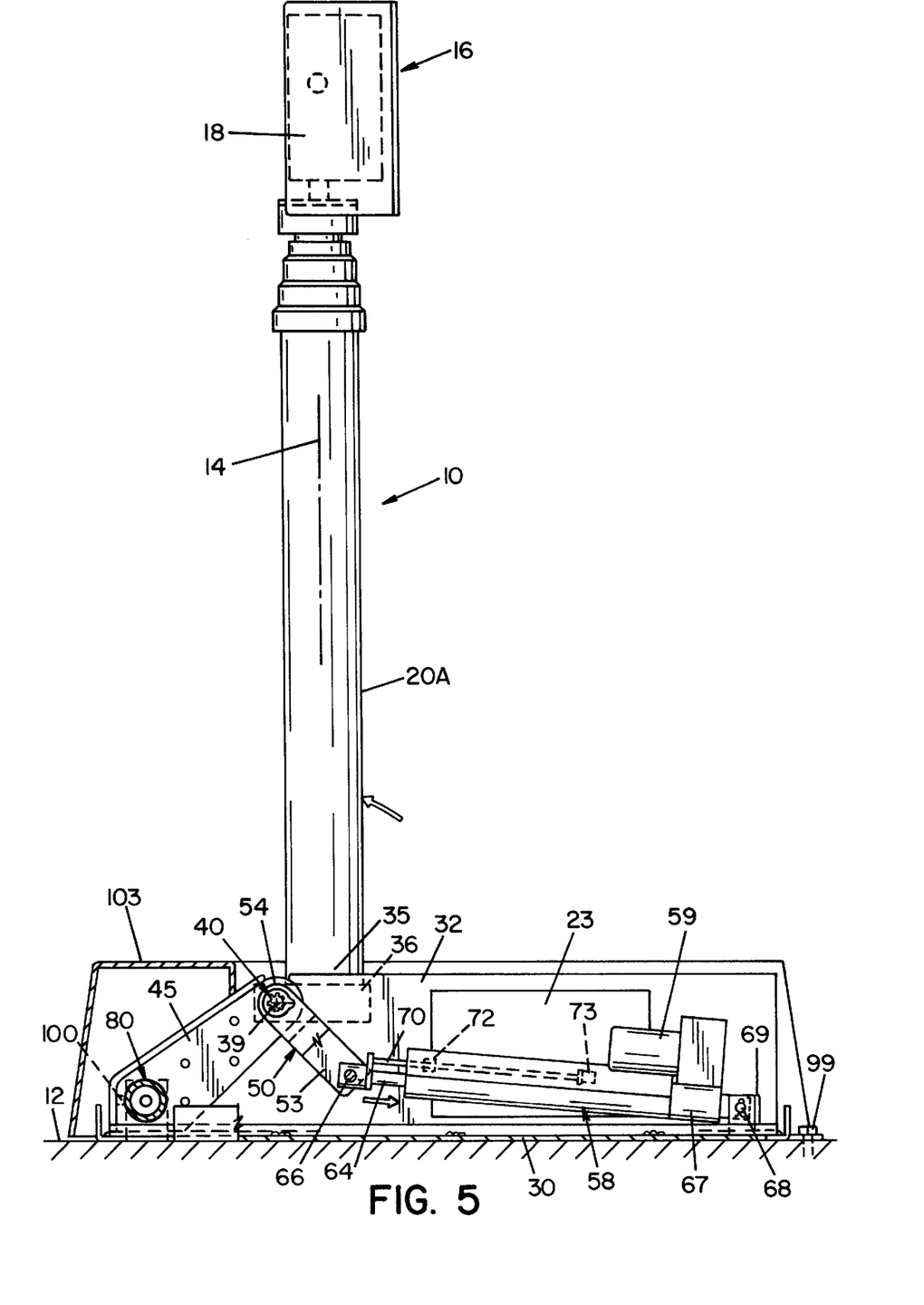
FIG. 5 is an elevation view similar to FIG. 4 illustrating the position of the mast construction in a vertically upright, raised or extended position.
Figure 6:
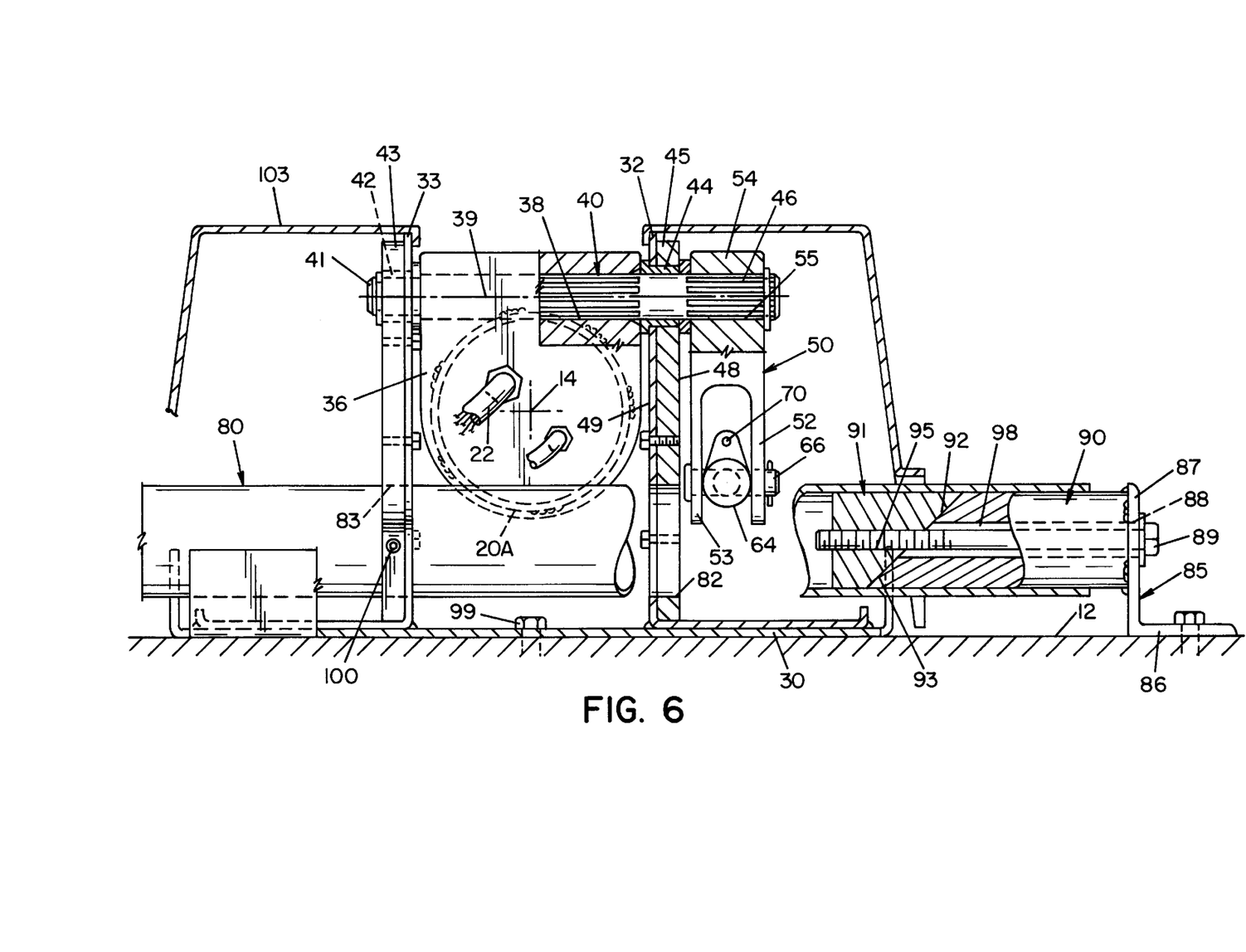
FIG. 6 is an end view, partially in section of the mounting arrangement for the mast construction taken along lines 6—6 of FIG. 3.

As best shown in FIG. 6, one pivot shaft end 41 adjacent second support plate 33 is cylindrical and journalled within second bushing 42 pressed into a second saddle or bearing block 43 secured to the uppermost end of second shaft support plate 33. Similarly, a cylindrical section of pivot shaft 40 is likewise journalled in a first bushing 44 pressed into a first bearing block 45 secured to the exposed end of first support shaft plate 32. A splined end 46 of pivot shaft 40 extends beyond first bushing 44 for purposes which will be shortly explained. It should be clear that pivot shaft 40 when rotated and because of its splined connection with collar 36, will raise and lower mast construction 10 between the positions shown in FIGS. 2, 4 and 5.

Figure 4:
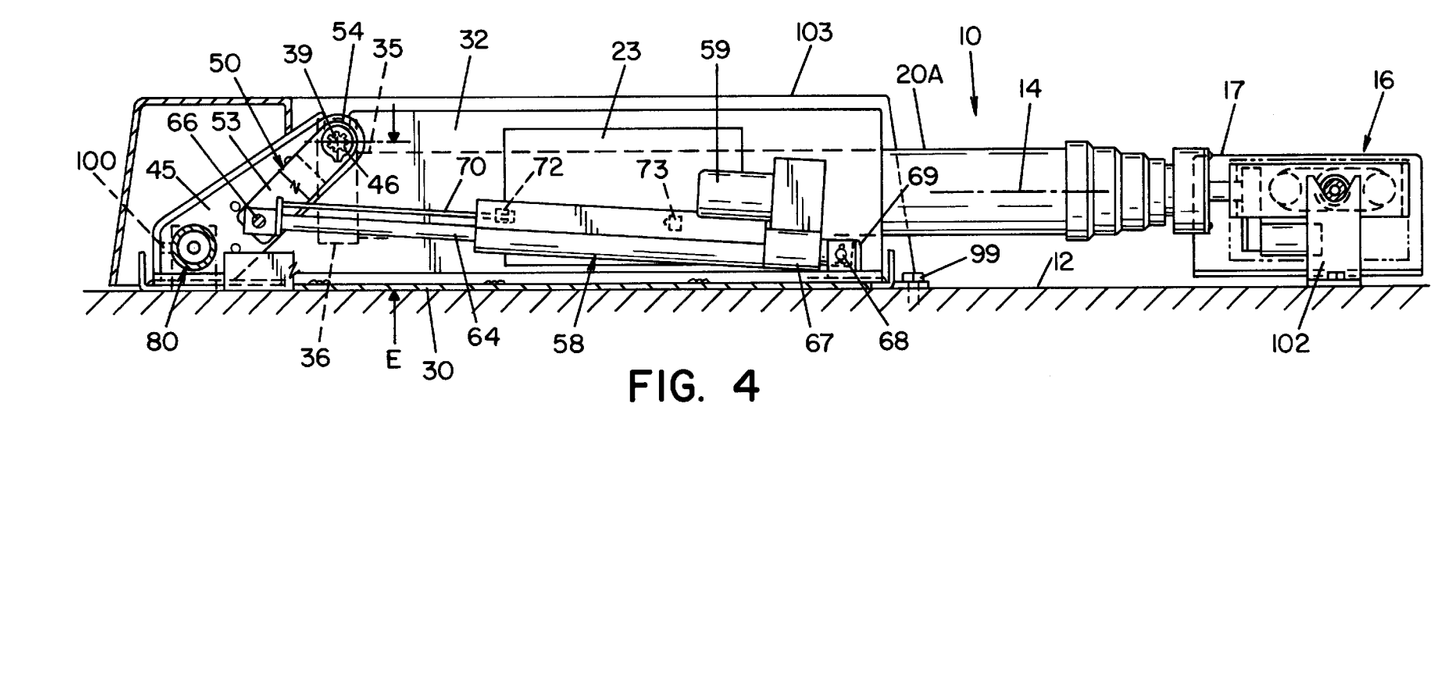
FIG. 4 is an elevation view, partially in section of the mast construction shown in FIG. 3 taken along lines 4—4 thereof.

Importantly, pivot shaft centerline 39, as best shown in FIGS. 4 and 6, is transversely spaced from mast centerline 14. Specifically, with mast construction 10 in its horizontal, retracted stored position, as best shown in FIG. 4, pivot shaft centerline 39 is adjacent the vertically highest position of lowest mast section 20A. Thus, the highest elevation point of mast construction 10 (the surface furthestmost displaced vertically upward from roof 12) is pivot shaft 40. By maintaining pivot shaft centerline 39 at a minimum elevation from roof 12, indicated by reference letter E as shown in FIG. 4, a low profile mount arrangement results.

Affixed by a spline connection to splined end portion 46 of pivot shaft 40 is a pivot link 50. Pivot link 50 extends adjacent a side 48 of first bearing block 45 which is opposite side 49 of first shaft support plate 32 that is facing lowest mast section 20A. Preferably pivot link 50 is in the form of a clevis having a pair of transversely spaced legs 52, 53 connected at a longitudinally extending bight portion 54 which has grooved openings 55 for receiving splines of spline end 46 of pivot shaft 40. The clevis arrangement is preferred because the length of bight portion 54 of the clevis dissipates the moment arm effect resulting from the side mount of pivot link 50 as described while the spline arrangement permits pivot link 50 to be variably mounted relative to the position of telescoping mast construction 10 so that its arcuate path remains essentially horizontal.

Figure 7:
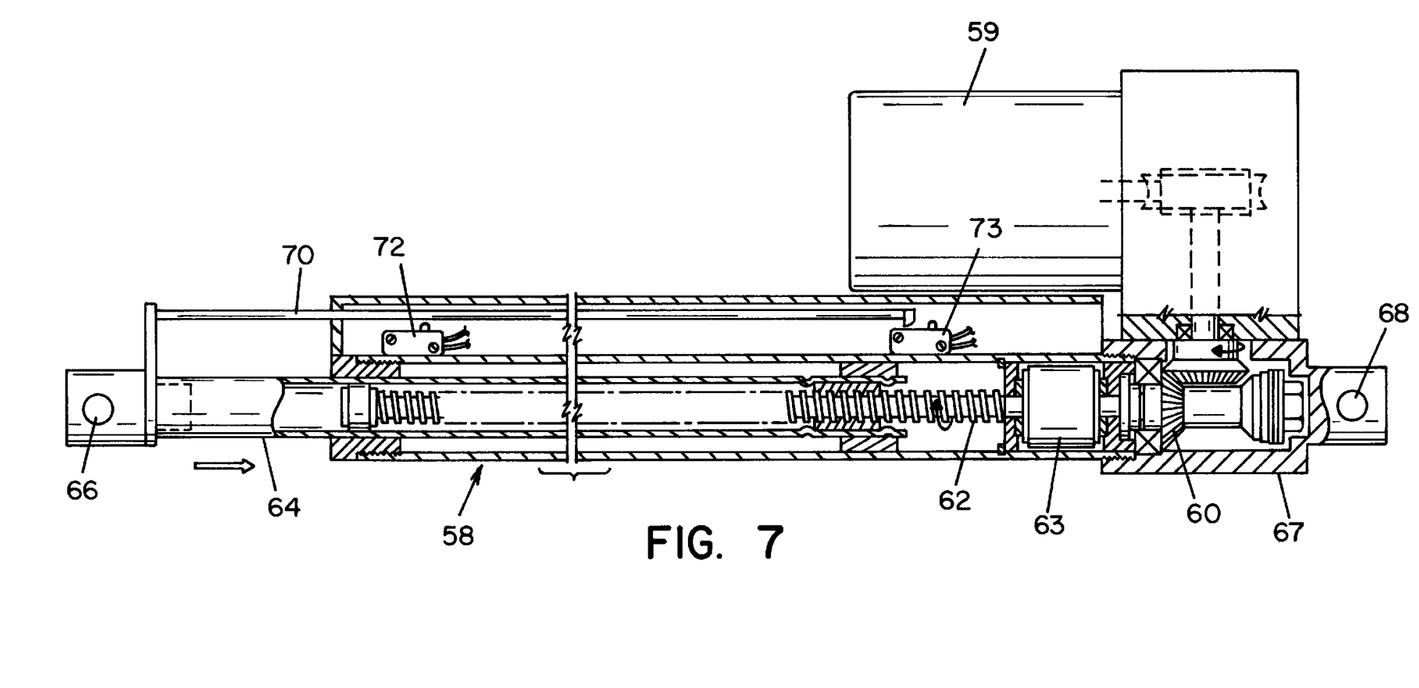
FIG. 7 is a schematic view, partially in section, of a conventional actuator used in the lift mechanism of the present invention; and, FIGS. 8, 9 and 10 are schematic, end views showing various positions of the telescoping mast construction relative to a vehicular roof made possible by the present invention.
Figure 8:
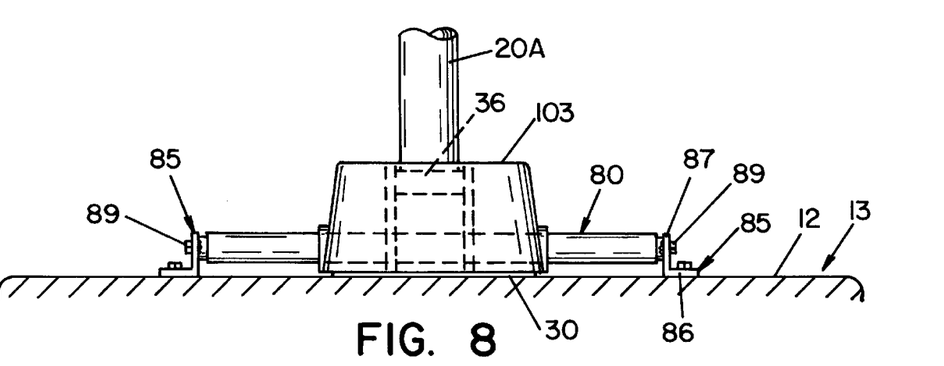

An actuator 58 is provided for rotating pivot shaft 40 through pivot link 50. As best shown in FIG. 7, actuator 58, which is a conventional device, includes an electric motor 59 which through a beveled gear arrangement 60 rotates a shaft 62 through a torque bearing 63 connected to an actuator rod 64 functioning as a lead screw. While this drive is conventional (available from Linak U.S. Inc.) and other drives such as a ball screw or a hydraulic driven actuator or a pneumatic actuator could be used as lift actuators, the selection of this particular drive is preferred because the electric driven gear arrangement provides high torque output while the lead screw arrangement permits precise mechanical positioning of actuator rod 64.

As best shown in FIGS. 3 through 5, actuator rod 64 is pinned at 66 while the actuator housing 67 is pinned at 68 to a bracket 69 secured to base plate 30. Extending from actuator rod 64 is a contact arm which, in the preferred embodiment, takes the shape of a contact rod 70 which moves with actuator rod 64 for actuation of a pair of adjustable micro limit switches 72, 73 which are adjustably mounted on a guide (not shown) parallel to the directional travel of contact rod 70. Positioning limit switches 72, 73 as shown in FIGS. 4 and 5, determines the extended and retracted positions of actuator rod 64 which, in turn, sets the horizontal and vertical positions of mast construction 10. Heretofore, limit switches were set and triggered based on the angular position of the pivot shaft or the lift bracket and while these limit switches adequately perform their intended function, the angular position of mast construction 10 could not be set with the precision achieved by utilizing the longer linear travel of actuator rod 64 as in the present invention. Further, the adjustment of the limit switch arrangement of the present invention is easily accomplished for any desired vertically tilted angle of the mast.

Further, as best shown by viewing FIGS. 4 and 5, actuator 58 is pinned at 2 points but remains substantially horizontal throughout the 90° rotation of mast construction 10 from its horizontal to its vertically upright position. This results from the short length of pivot link 50 and the positioning of pivot link 50 relative to stationary shaft supports 32, 33. Preferably, as shown in FIGS. 4 and 5, pivot link 50 is at a 45° angle relative to vertical when the mast construction 10 is horizontal and at a 45° angle on the other side of the vertical axis when mast construction 10 is upright. This positioning is achieved during assembly vis-a-vis the spline connection as discussed. The short pivot link arrangement increases the force required of actuator 58 which is the reason why a gear drive actuator with a precise lead screw position was selected and the spline connection permitting accurate positioning of pivot link 50 was similarly selected so that the force of the actuator could be efficiently utilized in a non-binding linkage arrangement. As noted, the side mount arrangement of actuator 58 produces a bending moment about pivot shaft 40. This moment tends to cause binding at pivot points 66, 68 which becomes excessive or aggravated should actuator 58 significantly pivot about its axis when raising and lowering mast construction 10. By maintaining longitudinal axis of actuator 58 substantially horizontal throughout the rotation of pivot link 50, the actuator force is directed to lifting mast construction 10 and is not directed to overcoming binding forces otherwise occurring at pivot connections 66, 68.

A hollow tubular outrigger 80 longitudinally extends in a direction transverse to longitudinal axis 14 of mast construction 10. Tubular outrigger 80 slidably extends through outrigger openings 82, 83 formed in first and second shaft support plates 32, 33 and first and second bearing blocks 45, 43 respectively. As best shown in FIG. 6, at each end of tubular outrigger 80 is an angle mounting bracket 85. Horizontal leg 86 of mounting bracket 85 is adapted to be fastened directly (or indirectly) to the vehicle's roof 12. The upright leg 87 of mounting bracket 85 has an opening 88, preferably a slotted opening, for receiving a threaded fastener 89. First and second cylindrical cam members 90, 91 having diameters less than the inside diameter of tubular outrigger 80 are provided for each end of tubular outrigger 80. Each cam member 90, 91 has an angular cam face surface 92, 93 respectively which, in the assembled position shown in FIG. 6, face one another and slide relative to one another. Second cam member 91 has a centrally positioned threaded opening longitudinally extending from its cam face surface 93. First cylindrical cam member 90 has a central opening 98 longitudinally extending therethrough. Central opening 98 is larger in diameter than that of threaded fastener 89 and may, alternatively, be formed in a slot. With the first and second cam members 90, 91 fitted into an open end of tubular outrigger 80, at least to a distance whereat each cam member's cam face surface 92, 93 is within the tube, tightening of threaded fastener 89 into second cam member's threaded opening 95 will cause one of the cam members (or both) to slide along cam face surface 92, 93 until contacting the interior diameter of tubular outrigger 80. Continued tightening of threaded fastener 89 will wedge cam members 90, 91 against the inside surface of tubular outrigger 80 thus locking tubular outrigger 80 to mounting bracket 85 and to vehicle's roof 12. This mounting arrangement is not dissimilar to that used to attach the handle bars of a bicycle to the front wheel's bicycle fork. Heretofore, the mounting arrangement for mast constructions simply bolted base plate 30 to the vehicle's roof.

Figure 9:
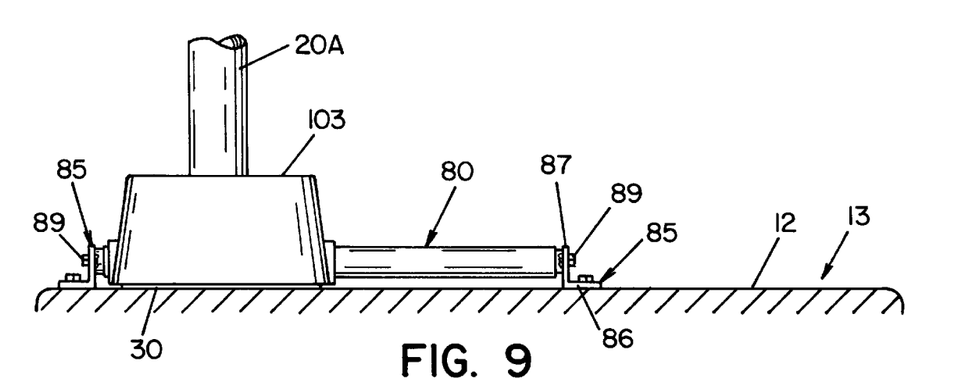
Figure 10:
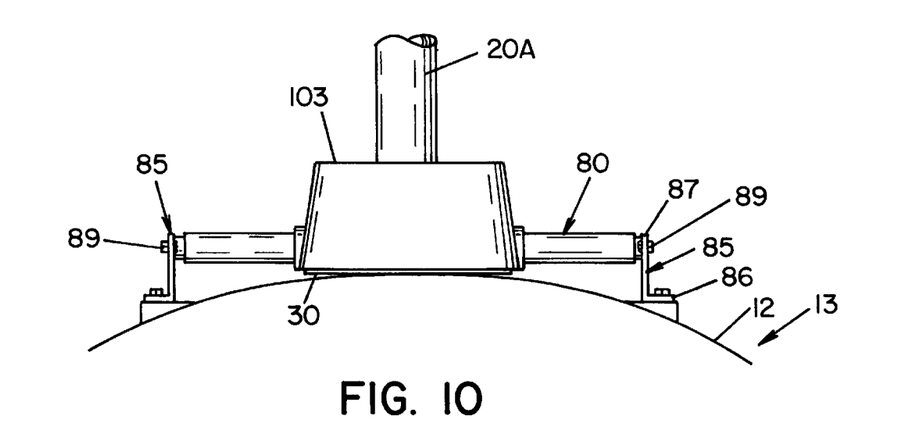

Tubular outrigger 80 provides several advantages. As already discussed, the side actuated/pivot shaft position discussed above achieves the desired low profile so that vehicles equipped with mast construction 10 can be stored or parked in normal garages and the like or pass under bridges or overhangs without raising significant concerns about the vertical clearance of the vehicle. Tubular outrigger 80 provides a stabilizing beam which not only renders the entire mounting arrangement more secure, but also counteracts any tendency of the unit to twist or skew as a result of the moment arm effect attributed to the side mount of actuator 58. Additionally, the arrangement permits attachment to the curved portions of vehicle roof 12 such as shown in FIG. 10. In such applications, base plate 30 will not uniformly contact the roof surface over its area. In addition, by the position of mounting brackets 85 at the ends of tubular outrigger 80, the attachment points are more towards the transverse edges of the vehicle's roof which is a stronger more secure roof section than attaching the assembly at the center of a curved roof. Finally, while light fixture 16 can pivot and rotate as described above, use situations may very well occur where the lateral position of mast construction 10 relative to the side of the vehicle must be shifted. Tubular outrigger 80 allows for the shift such as illustrated by the position shown in FIG. 9. In this regard, it should be noted that in a typical mounting of tubular mast construction 10 onto roof 12 of a vehicle, base plate 30 with its associated components, but less tubular mast construction 10 is placed onto the vehicle's roof and mounting brackets 85 secured. Then, a fastener(s) 99 may secure base plate 30 directly to roof 12. Alternatively, or in addition to fastener(s) 99, a set screw 100 at shaft support plates 32, 33 can lock tubular outrigger 80 to shaft support plates 32, 33, and thus, to base plate 30. Release of set screws 100 will allow optional movement to the position shown in the alternative embodiment shown in FIG. 9. Once base plate 30 and tubular outrigger 80 are affixed to the vehicle's roof, tubular mast construction 10 with collar 36 is inserted in the horizontal position illustrated in FIG. 4. Utility light 16 can rest on the light support bracket 102. Pivot shaft 40 is then inserted into pivot shaft opening 38 of collar 36 and pivot link 50 adjustably positioned at its preferred position as described above and pinned to actuator rod 64. Limit switches 72, 73 are set at the desired position and the electrical and pneumatic connections with tubular mast construction 10 made. A weatherproof low profile cover 103 is provided to protect and shield the mast operating elements from the weather.

The invention has been described with reference to a preferred embodiment and modifications thereof. Further modifications and alterations will become apparent or obvious to those skilled in the art upon reading and understanding the Detailed Description of the Invention. It is intended to include all such modifications and alterations insofar as they come within the scope of the present invention.

Having thus described the invention it is claimed:

1. In a telescoping mast construction adapted to be mounted on a vehicular roof and carrying at one of its ends an electrical fixture assembly, the mast construction including a plurality of adjacent telescoping mast sections slidable relative one another between a retracted position such as when the longitudinal axis of the mast construction is horizontal and an extended position such as when the longitudinal axis of the mast construction is vertical and the mast construction raised by telescoping mast sections from the lowest mast section, the improvement comprising:

a) a pair of longitudinally extending, transversely spaced shaft supports vertically extending from a base plate adapted to rest on the roof of a vehicle, the lowest mast section positioned between the shaft supports;

b) a collar mount secured to the bottom of the lowest mast section;

c) a pivot shaft secured to the collar mount on an axis laterally offset from the mast construction's longitudinal axis and adjacent the uppermost surface of the collar mount when the mast construction is horizontal, the pivot shaft having an uppermost surface portion when the mast construction is horizontal and being journalled in the shaft supports;

d) a pivot link rotatably secured to one axial end of the pivot shaft thereby extending vertically downward adjacent a pivot support side opposite the pivot support side adjacent the lowest mast section; and, e) a linear actuator having an actuator rod movable into and out of an actuator housing; the actuator rod pivotably secured to the pivot link and the actuator housing pivotably secured to the base plate whereby the length of the pivot link relative to the position of the pivot shaft provides a low profile mast mounting arrangement extending generally no higher than the uppermost surface portion of the pivot shaft when the longitudinal axis of the mast construction is in its stored horizontal position.

2. The mast construction of claim 1 further including first and second longitudinally adjustable and spaced actuator limit switches controlling movement of the actuator rod into and out of the actuator housing and a contact member movable with the actuator rod for contacting a limit switch at extended and retracted positions of the actuator rod whereby the rotation of the pivot link is precisely controlled by the longitudinal positions of the limit switches.

3. The mast construction of claim 2 wherein a splined connection secures the pivot shaft to the collar mount and a splined connection secures the pivot link to the pivot shaft whereby the position of the pivot link relative to the actuator rod may be variably set during mounting of the mast construction to the vehicle to assure longitudinal movement of the actuator rod in a substantially horizontal plane so that the mast construction can be effectively positioned in vertical and horizontal positions.

4. The mast construction of claim 3 wherein said pivot link is a clevis.

5. A vehicular lift mounting arrangement for a telescoping mast construction having a plurality of adjacent telescoping mast sections slidable relative to one another from a lowest mast section between a retracted and an extended position, said arrangement including a) a base plate positioned adjacent to and in contact with a section of the vehicle's roof;

b) first and second transversely spaced support plates vertically extending upward from the base plate, the lowest mast section positioned therebetween;

c) a collar mount secured to the bottom of the lowest mast section, the collar mount having a pivot shaft opening extending therethrough along a pivot axis transverse to the longitudinal axis of the lowest mast section and vertically upwardly positioned from the lowest mast section's longitudinal axis when the lowest mast section is parallel with the vehicle's roof;

d) a pivot shaft within the pivot shaft opening, the pivot shaft rotatably secured to the collar mount and journalled in the shaft support plates and having a link end extending beyond the first support plate away from the lowest mast section;

e) a pivot link rotatably secured to the link end of the pivot shaft and extending vertically downward therefrom; and f) an actuator having an actuator rod pivotably secured to the pivot link and an actuator housing pivotably secured to the base plate.

6. The mounting arrangement of claim 5 further including first and second longitudinally adjustable and spaced actuator limit switches controlling movement of the actuator rod into and out of the actuator housing and a contact member movable with the actuator rod for contacting a limit switch at extended and retracted positions of the actuator rod whereby the rotation of the pivot link is precisely controlled by the longitudinal positions of the limit switches.

7. The mounting arrangement of claim 6 wherein a splined connection secures the pivot shaft to the collar mount and a splined connection secures the pivot link to the pivot shaft whereby the position of the pivot link relative to the actuator rod may be variably set during mounting of the mast construction to the vehicle to assure longitudinal movement of the actuator rod in a substantially horizontal plane so that the mast construction can be effectively positioned in vertical and horizontal positions.

8. The mounting arrangement of claim 7 wherein said pivot link is a clevis.

\* \* \* \* \*